(12) United States Patent
Aston et al.

(10) Patent No.: US 9,897,130 B2
(45) Date of Patent: Feb. 20, 2018

(54) TELESCOPING CAP ASSEMBLY FOR ENCAPSULATING A FASTENER DISPOSED WITHIN A CONFINED SPACE

(71) Applicant: The Boeing Company, Chicago, IL (US)

(72) Inventors: Richard W. Aston, Brea, CA (US); Anna M. Tomzynska, Seal Beach, CA (US); Michael J. Langmack, Huntington Beach, CA (US); Jazzmin P. Martinez, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 54 days.

(21) Appl. No.: 15/130,273

(22) Filed: Apr. 15, 2016

(65) Prior Publication Data

US 2017/0298979 A1 Oct. 19, 2017

(51) Int. Cl.
*F16B 37/14* (2006.01)
*B64D 45/02* (2006.01)
*F16B 33/00* (2006.01)

(52) U.S. Cl.
CPC .............. *F16B 37/14* (2013.01); *B64D 45/02* (2013.01); *F16B 33/004* (2013.01)

(58) Field of Classification Search
CPC ....... F16B 11/006; F16B 33/004; F16B 37/14
USPC .................... 411/82, 82.1, 372.5, 372.6, 373
See application file for complete search history.

(56) References Cited

U.S. PATENT DOCUMENTS

| 5,082,409 | A | * | 1/1992 | Bias | .................. | F16B 37/14 411/372.5 |
| 7,837,148 | B2 |   | 11/2010 | Kismarton et al. | | |
| 7,887,009 | B2 |   | 2/2011 | Keeler, Jr. et al. | | |
| 8,388,293 | B2 | * | 3/2013 | Hutter, III | ............... | F16B 37/14 411/377 |
| 8,894,338 | B2 | * | 11/2014 | Dobbin | .................. | B64D 45/02 411/369 |
| 8,993,097 | B2 |   | 3/2015 | Kwon et al. | | |
| 9,011,062 | B2 | * | 4/2015 | Chirol | .................. | F16B 33/004 411/372.5 |
| 2008/0134971 | A1 |   | 6/2008 | Bradley | | |

(Continued)

FOREIGN PATENT DOCUMENTS

CN          103388614 A     11/2013

OTHER PUBLICATIONS

Search Report for related European Application No. EP17153195.7, report dated Aug. 3, 2017.

(Continued)

*Primary Examiner* — Roberta S Delisle

(74) *Attorney, Agent, or Firm* — Miller, Matthias & Hull LLP

(57) ABSTRACT

This disclosure provides a cap assembly for encapsulating a fastener or portion of a fastener that protrudes from a surface and into a confined space. The cap assembly includes a plurality of nested sections that telescope a collapsed configuration to an extended configuration. The plurality of nested sections includes a base section that includes a base rim that engages the surface in the extended configuration. The plurality of nested sections also includes an end section that has an end wall. The end wall and the base rim define a length of the cap assembly in the extended configuration that is sufficient to encapsulate the fastener within the cap assembly with the base rim engaging the surface and the end wall spaced apart from a distal end of the fastener.

19 Claims, 2 Drawing Sheets

(56) References Cited

U.S. PATENT DOCUMENTS

| | | | |
|---|---|---|---|
| 2011/0305539 A1* | 12/2011 | Rand | F16B 37/14 411/373 |
| 2013/0322982 A1* | 12/2013 | Dobbin | B64D 45/02 411/82 |
| 2014/0341675 A1* | 11/2014 | Dobbin | B64D 45/02 411/82.1 |
| 2015/0041589 A1 | 2/2015 | Hasan et al. | |

* cited by examiner

TELESCOPING CAP ASSEMBLY FOR ENCAPSULATING A FASTENER DISPOSED WITHIN A CONFINED SPACE

BACKGROUND

Technical Field

This disclosure relates to telescoping cap assemblies used for encapsulating fasteners disposed within confined spaces and, more specifically to telescoping cap assemblies for encapsulating such fasteners with electrically insulating sealant.

Description of the Related Art

A typical aircraft wing assembly includes a central wing box and wings cantilevered from opposing sides of the wing box by "side of body joints." The wings typically include spaces that serve as fuel tanks. Some of the fasteners that connect the outer skin of the wings to the central wing box or to the side of body joints extend into the fuel tanks. To prevent an electrical discharge within such a fuel tank in the case of a lightning strike, aircraft manufacturers encapsulate the portions of the fasteners that extend from the skin into the tank in an electrically insulating material or insulating sealant. However, because of the confined space, encapsulating the portions of such fasteners that extend into the fuel tanks is problematic, labor intensive and often requires filling large portions of the side of body joints with insulating sealant, resulting in substantial added weight.

Accordingly, a need exists for in improved device and method for encapsulating portions of fasteners that extend into confined spaces. This need applies to the aircraft industry and other industries as well.

SUMMARY OF THE DISCLOSURE

Embodiments of this disclosure provide a cap assembly for encapsulating a fastener or a portion of a fastener that protrudes from a surface. In at least one embodiment, the cap assembly comprises a plurality of nested sections that telescope from a collapsed configuration to an extended configuration. The plurality of nested sections comprises a base section comprising a base rim that engages the surface in the extended configuration. The plurality of nested sections also comprises an end section that comprises an end wall. Wherein the end wall and base rim define a length of the cap assembly in the extended configuration that is sufficient to encapsulate the fastener within the cap assembly with the base rim engaging the surface and the end wall being spaced apart from the distal end of the fastener.

This disclosure also provides methods for encapsulating a portion of a fastener with sealant wherein said portion of the fastener extends from a first surface into a space between the first surface and a second surface with limited clearance between a distal end of the fastener and the second surface. The part of the fastener that extends into the space has a length greater than the limited clearance. The methods comprise providing a telescoping cap assembly having an extended configuration of a length at least as long as said portion of the fastener to be encapsulated and a collapsed configuration sufficiently short to allow the cap assembly to be brought into a position in the limited clearance between the distal end of the fastener and the second surface. The methods further comprise collapsing the cap assembly to the collapsed configuration and positioning the cap assembly while in the collapsed configuration between the distal end of the fastener and the second surface. The methods further comprise telescoping the cap assembly over said portion of the fastener to the extended configuration to cover said portion of the fastener and engage the first surface. The methods also comprise providing a sufficient amount of sealant within the cap assembly to encase said portion of the fastener in the sealant.

This disclosure also provides methods of manufacturing a telescoping cap assembly. The telescoping cap assembly comprises a plurality of nested sections comprising a base section and an end section. The end section connects to an end wall. Each of the nested sections has a large end and a small end and, with the exception of the end section, an interior surface of the small end of each nested section is smaller than an exterior surface of the large end of a successive nested section thereby limiting extension of the cap assembly in an extended configuration. The methods comprise 3D printing the large end of the base section. The methods further comprise simultaneously 3D printing the plurality of nested sections in a partially extended configuration so the plurality of nested sections are not in contact with one another during the 3D printing to ensure the nested sections will be moveable relative to one another after the 3D printing has been completed. The methods further comprise 3D printing the end wall.

Other advantages and features will be apparent from the following detailed description when read in conjunction with the attached drawings.

BRIEF DESCRIPTION OF THE DRAWINGS

For a more complete understanding of the disclosed methods and apparatuses, reference should not be made to the embodiment illustrated in greater detail on the accompanying drawings, wherein.

The drawings are not necessarily to scale and may illustrate the disclosed embodiments diagrammatically and/or in partial views. In certain instances, the drawings may omit details which are not necessary for an understanding of the disclosed methods and apparatuses or which render other details difficult to perceive. This disclosure is not limited to the particular embodiments illustrated herein.

DETAILED DESCRIPTION OF THE PRESENTLY PREFERRED EMBODIMENTS

Figure 1:
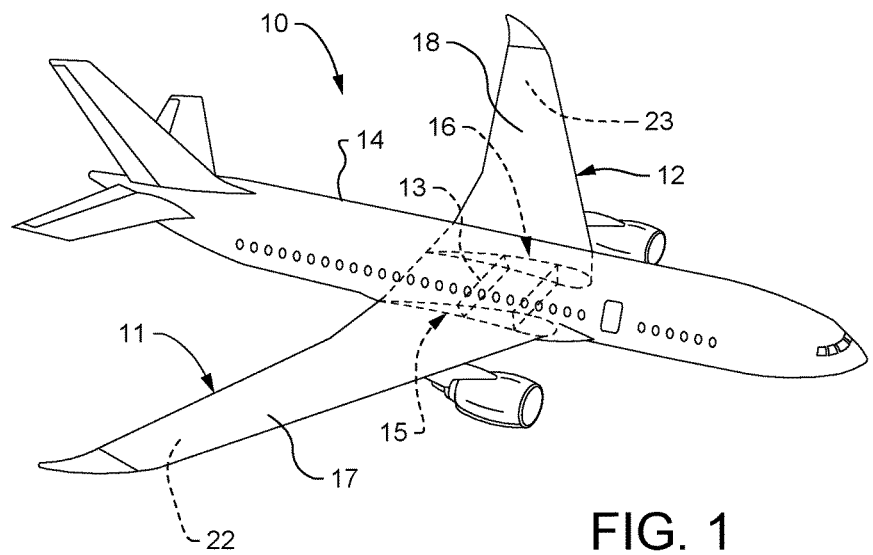
FIG. 1 is a perspective view of an aircraft.

FIG. 1 provides a perspective view of an aircraft 10. Embodiments of this disclosure reveal various means for sealing or encapsulating fasteners used to secure components of the aircraft 10 together. The aircraft 10 includes wings 11, 12 disposed on either side of and connected to a central wing box 13 that extends through the fuselage 14 of the aircraft 10. The wings 11, 12 connect to the fuselage 14 and the wing box 13 at the side of body joints 15, 16 respectively. The wings 11, 12 each include outer skins, including upper skins 17, 18 and lower skins 22, 23 respectively.

While various spacial and directional terms, such as top, bottom, lower, upper, mid, lateral, horizontal, vertical, front, rear and the like may be used to describe embodiments disclosed herein, it is understood that such terms are used with respect to the orientation shown in the drawings. The orientations may be inverted, rotated or otherwise changed such that an upper portion becomes a lower portion and vice versa, and horizontal becomes vertical and the like.

Further, the terms fastener, part of a fastener or portion of a fastener refers to the fasteners that connect a wing skin 17, 18, 22, 23 and extend at least partially into spaces provided in the wings 11, 12 that may serves as fuel tanks. The cap assemblies and methods disclosed herein are not limited to aircraft applications, but are applicable to other situations where fasteners or portions of fasteners are disposed within confined spaces and that require encapsulation, with or without the need for insulating sealant.

Figure 6:
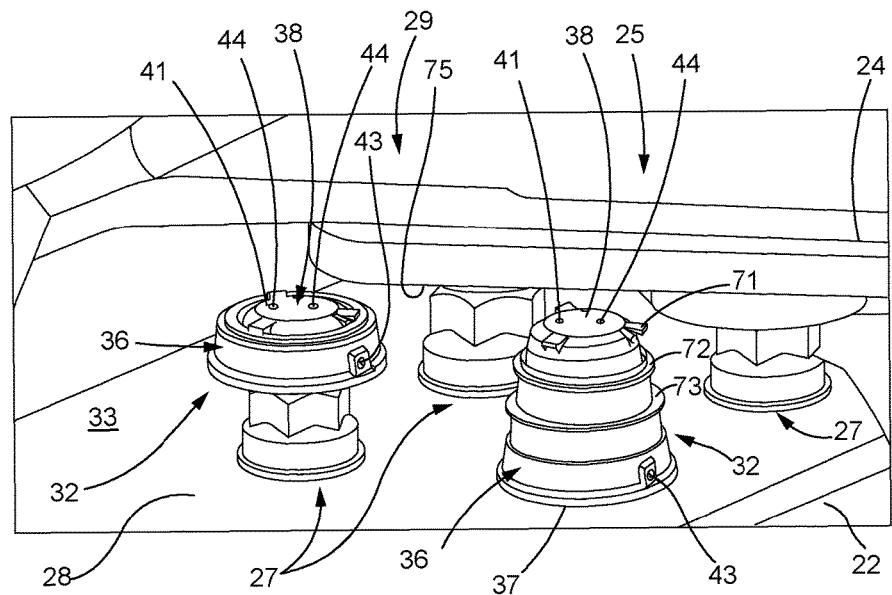
FIG. 6 is a partial perspective view of a side of body joint showing four fasteners (or portions thereof) that extend through the wing skin and side of body chord and into a space within the wing that, in some embodiments, may serve as a fuel tank and further illustrating one disclosed cap assembly positioned above a distal end of one fastener in the collapsed configuration and a second cap assembly that has been telescoped downward over another fastener to encapsulate said other fastener.
Figure 7:
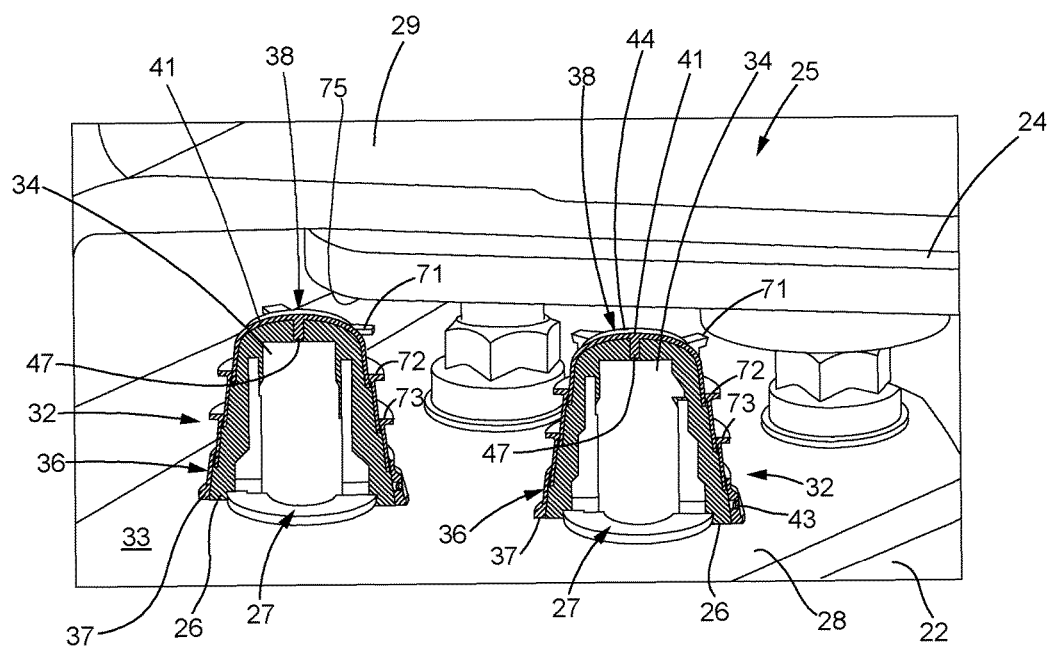
FIG. 7 is another partial perspective view of the side of body joint illustrated in FIG. 6 as well as sectional views of two fasteners encapsulated by two of the disclosed cap assemblies and encased with sealant within the cap assemblies.

Various fasteners secure the upper skins 17, 18 and lower skins 22, 23 to the central wing box 13 and fuselage 14 at the side of body joints 15, 16 respectively. Further, while the space between the upper skin 17 and lower skin 22 of the wing 11 and the space between the upper skin 18 and lower skin 23 of the wing 12 accommodates various structural components such as the stringer 24 and side of body chord 25 as shown in FIGS. 6-7, the space between the upper skin 17 and lower skin 22 of the wing 11 and the space between the upper skin 18 and lower skin 23 of the wing 12 may also be used to accommodate fuel. Accordingly, any fasteners used to connect the uppers skins 17, 18 or lower skins 22, 23 to the central wing box 13 and/or fuselage 14 via a side of body chord 25 (or other structure) require encasement in an insulating sealant 26 as shown in FIG. 7. The sealant 26 prevents an electrical discharge within the fuel tank in the event of a lightning strike. Thus, as shown in FIGS. 6-7, various types of fasteners 27 secure the lower skin 22 of the wing 11 to the lower flange 28 of the side of body chord 25. The side of body chord 25 also includes an upper flange 29 that connects to the stringer 24 but not by fasteners that pass through the upper skin 17 or lower skin 22. This disclosure addresses the fasteners 27 that pass through the upper skins 17, 18 or lower skins 22, 23 and at least partially into spaces between the upper skin 17 and lower skin 22 or between the upper skin 18 and lower skin 23 that may serve as fuel tanks. Hence, the disclosure addresses the fasteners 27 (or portions the fasteners 27) of FIGS. 6-7.

Figure 2:
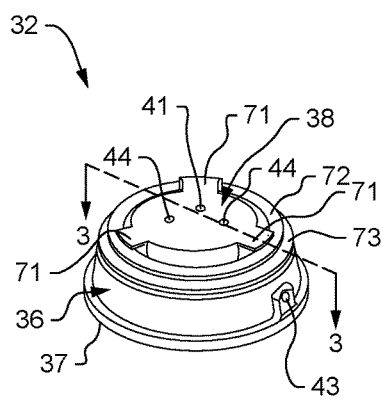
FIG. 2 is a perspective view of a telescoping cap assembly in a collapsed configuration in accordance with one embodiment of this disclosure.
Figure 3:
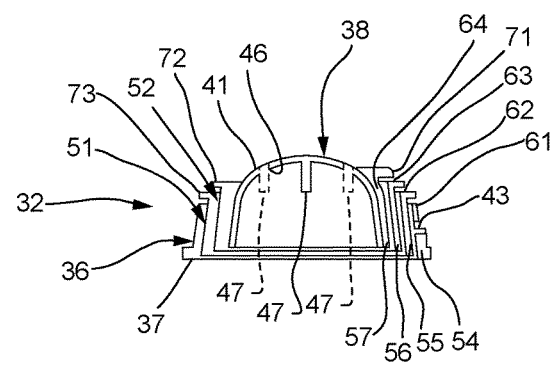
FIG. 3 is a sectional view of the cap assembly taken substantially along line 3-3 of FIG. 2, but with the cap assembly in a slightly extended configuration, suitable for 3D printing.
Figure 4:
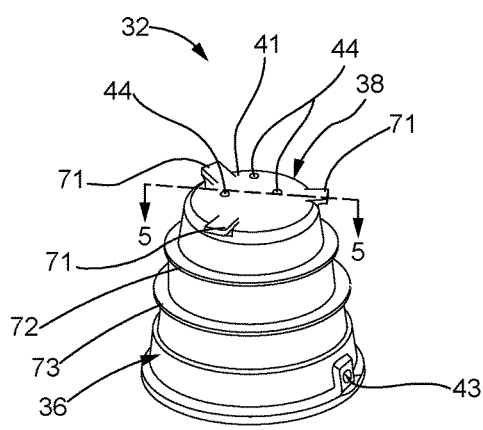
FIG. 4 is a perspective view of the cap assembly shown in FIGS. 2-3 in a fully extended position.
Figure 5:
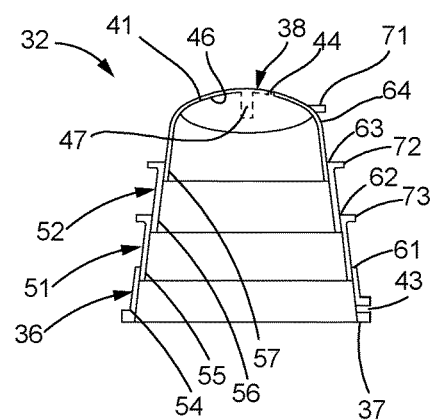
FIG. 5 is a sectional view of the cap assembly shown in FIGS. 2-4 and taken substantially along line 5-5 of FIG. 4.

In order to prevent an electrical discharge in the event of a lightning strike to the wings 11, 12 or fuselage 14, the fasteners 27 used to connect the wing skins 17, 18, 22, 23 at the side of body joints 15, 16 are encapsulated by cap assemblies, one example of which is shown as the cap assembly 32 shown in FIGS. 2-5. FIGS. 2-5 illustrate one disclosed cap assembly 32 that encapsulates a fastener 27 (or portion of a fastener 27) protruding from a surface 33 and that terminates at a distal end 34 as shown in FIGS. 6-7. In at least one embodiment, such as the embodiment shown in FIGS. 2-5, the cap assembly 32 comprises a plurality of nested sections 38, 52, 51, 36 that telescope from a collapsed configuration as shown in FIGS. 2-3 to an extended configuration as shown in FIGS. 3-4. The plurality of nested sections 38, 52, 51, 36 comprises a base section 36 that comprises a base rim 37 that engages the surface 33 in the extended configuration as shown in FIGS. 6-7. FIGS. 3-4 illustrate the extended configuration. The plurality of nested sections 38, 52, 51, 36 further comprises an end section 38 that comprises or connects to an end wall 41. The end wall 41 and base rim 37 define a length $L_1$ in the extended configuration as shown in FIGS. 5-7 that is sufficient to encapsulate the fasteners 27 or portions of the fasteners 27 within the cap assembly 32 with the base rim 37 engaging the surface 33 and the end wall 41 spaced apart from the distal end 34 of the fastener 27 as illustrated in FIG. 7. The fasteners 27 or the portions of the fasteners 27 disposed above or beyond the surface 22 have a length $L_2$ with a clearance C between the distal ends 34 of the fasteners 27 and the surface 75 as shown in FIG. 7. The length or height of the cap assembly 32 in the collapsed configuration is $L_3$ as shown in FIG. 3. To facilitate encapsulation of the fasteners 27, in one embodiment, $L_3$ is less than C.

In at least one embodiment, the end section 38 forms a cup as shown in FIGS. 3 and 7 that may accommodate an amount of sealant 26 that is sufficient to encapsulate or encase the fastener 27 or portion of the fastener 27 within the cap assembly 32 after the cap assembly 32 has been moved from the collapsed configuration shown in FIGS. 2-3 to the extended configuration shown in FIGS. 4-5 and FIG. 7. In the event the end section 38 does not provide enough volume to accommodate a sufficient amount of sealant 26 to encapsulate the fastener 27 or the portion of the fastener 27 that extends past the surface 33, the cap assembly 32 may include various orifices, such as an inlet orifice 43 and one or more outlet orifices 44 for venting the cap assembly 32 during injection of the sealant 26.

In one or more embodiments, the end wall 41 comprises an interior surface 46 (FIGS. 3 and 5) that faces the fastener 27 or the part of the fastener 27 that extends beyond the surface 33. In such an embodiment, the interior surface 46 connects to at least one nub 47 that engages the fastener 27 and provides spacing between the distal end 34 of the fastener 27 and the end wall 41, thereby enabling encasement of the distal end 34 of the fastener 27 with sealant 26. In another embodiment, the interior surface 46 connects to a plurality of nubs 47 as shown schematically in FIG. 3 that are disposed around the distal end 34 of the fastener 27 to center the cap assembly 32 on the fastener 27 when the cap assembly 32 moves to the extended configuration.

In at least one embodiment, each of the nested sections 36, 51, 52, 38 includes a large end 54, 55, 56, 57 and a small end 61, 62, 63, 64 (FIGS. 3 and 5). The small end 64 of the end section 38 connects to the end wall 41. With the exception of the end section 38, an interior surface of the small end 61, 62, 63 of the nested sections 36, 51, 52 engages an exterior surface of the large end 55, 56, 57 of a successive nested section 51, 52, 38, thereby limiting extension of the cap assembly 32 in the extended configuration. Further, in some embodiments, the end wall 41 of the end section 38 and the small ends 62, 63 of the other nested sections 51, 52 respectively, except the base section 36, comprise a radially outwardly extending member 71, 72, 73 that engages the small end 63, 62, 61 respectively of a successive nested section 52, 51, 36 upon collapse of the cap assembly 32 to the collapsed configuration (FIG. 2) to positively capture the nested sections 38, 52, 51, 36 within one another when the cap assembly 32 is in the collapsed configuration.

While one embodiment of the disclosed the cap assembly 32 includes four nested sections 38, 52, 51, 36 and those nested sections 38, 52, 51, 36 are frusto-conical in shape, or the side walls of the nested sections 38, 52, 51, 36 are frusto-conical or have the shape of a cone frustum, the nested sections 38, 52, 51, 36 may also have shapes selected from the group consisting of a cone frustum, a pyramid frustum, a square frustum, and a pentagonal frustum. Other shapes will be apparent to those skilled in the art. Suitable materials for forming the nested sections 38, 52, 51, 36 include thermoplastics. In one or more embodiments, the thermoplastic may be PEKK (polyetherketoneketone). PEKK is particularly suitable for applications where the cap assembly 32 is disposed within a fuel tank of an aircraft because PEKK is compatible with jet fuel. However, manufacturers may employ other polymers or thermoplastics, depending upon the application, as will be apparent to those skilled in the art. For example, for those applications where the cap assembly 32 is not exposed to jet fuel, various thermoplastics that are suitable for 3D printing are available and are apparent to those skilled in the art.

In another embodiment, this disclosure provides a method for encapsulating a part or portion of a fastener 27 with sealant 26 wherein said portion of the fastener 27 extends from a first surface 33 and into a space defined by the first surface 33 and a second surface 75 (FIGS. 6-7) with limited clearance C between a distal end 34 of the fastener 27 and the second surface 75 (FIG. 7). Further, the disclosed method applies when the portion of the fastener 27 that extends into the space as a length $L_2$ that is greater than the limited clearance C. One disclosed method comprises providing a telescoping cap assembly 32 having an extended configuration of a length $L_1$ that is at least as long as said portion of the fastener 27 to be encapsulated ($L_2$ as shown in FIG. 7) and a collapsed configuration having a length $L_3$ (FIG. 2) sufficiently short to allow the cap assembly 32 to be brought into a position in the limited clearance C (FIG. 7) between the distal end 34 of the fastener 27 and the second surface 75. The method also comprises collapsing the cap assembly 32 to the collapsed configuration as shown in FIG. 2, positioning the cap assembly 32 while in the collapsed configuration between the distal end 34 of the fastener 27 and the second surface 75, telescoping the cap assembly 32 over said portion of the fastener 27 to the extended configuration to cover said portion of the fastener 27 and engage the first surface 33 with the base rim 37 of the base section 36 as shown in FIG. 7. The method further comprises providing a sufficient amount of sealant 26 within the cap assembly 32 to encase said portion of the fastener 27 in the sealant 26. As noted above, the sealant may be pre-loaded into the end section 38 or injected through the orifices 43, 44.

In at least one embodiment, the telescoping cap assembly 32 comprises a plurality of nested sections 38, 52, 51, 36 that telescope from the collapsed configuration to the extended configuration. The plurality of nested sections 38, 52, 51, 36 comprise a base section 36 comprising a base rim 37 that engages the first surface 33 in the extended configuration. The plurality of nested sections 38, 52, 51, 36 further comprises an end section 38 that comprises an end wall 41 such that the end wall 41 and the base rim 37 define a length $L_1$ of the cap assembly 32 in the extended configuration that is sufficient to encapsulate the portion of the fastener 27 that extends above the first surface 33. Further, in one or more embodiments, each of the nested sections 38, 52, 51, 36 has a large end 57, 56, 55, 54 and a small end 64, 63, 62, 61 respectively. The small end 64 of the end section 38 connects to the end wall 41. With the exception of the end section 38, an interior surface of the small end 63, 62, 61 of each nested section 52, 51, 36 engages an exterior surface of the large end 57, 56, 55 of a successive section so as to limit extension of the cap assembly 32 in the extended configuration. Further, the end wall 41 and the small ends 64, 63 of the other nested sections 52, 51, except the base section 36, each comprise a radially outwardly extending member 71, 72, 73 respectively that engages the small end 63, 62, 61 of a successive nested section 52, 51, 36 upon collapse of the cap assembly 32 to positively capture the nested sections 38, 52, 51, 36 within one another when the cap assembly 32 is in the collapsed configuration. The number of nested sections 38, 52, 51, 36 may vary as well as their shape, with suitable shapes including a cone frustum, a pyramid frustum, a square frustum, a pentagonal frustum and others. The method may further include, prior to positioning the cap assembly 32 between the distal end 34 of the fastener 27 and the second surface 75, filling the end section 38 with the sufficient amount of sealant to encase said portion of the fastener 27 after telescoping the cap assembly 32 over said portion of the fastener 27 to its extended configuration as shown in FIG. 7. In contrast, if the end section 38 does not provide a sufficient volume for the sealant 26 to encase the fastener 27 as shown in FIG. 7, the cap assembly may include an inlet orifice 43 and at least one outlet orifice 44 for venting the cap assembly 32 during injection of the sealant 26.

This disclosure also provides a method of manufacturing a telescoping cap assembly 32. The telescoping cap assembly 32 comprises a plurality of nested sections 38, 52, 51, 36 including a base section 36 and an end section 38. The end section 38 connects to an end wall 41. Each of the nested sections 38, 52, 51, 36 has a large end 57, 56, 55, 54 and a small end 64, 63, 62, 61. With the exception of the small end 64 of the end section 38 and the large end 54 of the base section 36, an interior surface of the small end 63, 62, 61 of each nested section is smaller than an exterior surface of a large end 57, 56, 55 of a successive nested section so as to limit extension of the cap assembly in the extended configuration as illustrated in FIGS. 5-7.

At least one disclosed method comprises 3D printing the large end 54 of the base section 36. The method also comprises simultaneously 3D printing the plurality of nested sections 51, 52, 38 in a partially extended configuration so the plurality of nested sections 38, 52, 51, 36 will be moveable relative to one another. The method further comprises 3D printing the end wall 41. In at least one embodiment, the method further comprises 3D printing a radially outwardly extending member 71 on the end wall 41 and on the small ends 63, 62 of each other nested section 52, 51, except the base section 36. Each radially outwardly extending member 71, 72, 73 engages the small end 63, 62, 61 of a successive nested section 52, 51, 36 upon collapse of the cap assembly 32 to a collapsed configuration thereby positively capturing the nested sections 38, 52, 51, 36 within one another as shown in FIGS. 2-3.

3D printing or additive manufacturing allows ease of customization of the telescoping cap assembly 32 to accommodate a wide variety of nut geometries and configurations without the need to design and built tooling and without requiring assembly of the sections 36, 51, 52, 38. Preferred 3D printing or additive manufacturing techniques include, but are not limited to selective laser sintering (SLS) and fused deposition modeling (FDM).

While only certain embodiments have been set forth, alternatives and modifications will be apparent from the above description to those skilled in the art. Further, aspects of different embodiments can be combined or substituted by one another. These and other alternatives are considered equivalents and within the spirit and scope of this disclosure and the appended claims.

The invention claimed is:

1. A cap assembly for encapsulating a fastener protruding from a surface and terminating at a distal end, the cap assembly comprising:
   a plurality of nested sections that telescope from a collapsed configuration to an extended configuration, the plurality of nested sections comprising a base section comprising a base rim that engages the surface in the extended configuration, the plurality of nested sections further comprising an end section that comprises an end wall,
   wherein the end wall and base rim define a length of the cap assembly in the extended configuration that is sufficient to encapsulate the fastener within the cap assembly with the base rim engaging the surface and the end wall spaced apart from the distal end of the fastener; and
   further comprising an inlet orifice for receiving sealant and an outlet orifice for venting the cap assembly during sealant injection.

2. The cap assembly of claim 1 wherein the end section accommodates an amount of sealant sufficient to encapsulate the fastener within the cap assembly after the cap assembly has been moved from the collapsed configuration to the extended configuration.

3. The cap assembly of claim 1 wherein the end wall comprises an interior surface that faces the fastener, the interior surface connected to at least one nub for engaging the fastener and providing spacing between the fastener and the end wall.

4. The cap assembly of claim 1 wherein the end wall comprises an interior surface that faces the distal end of the fastener, the interior surface connected to a plurality nubs disposed around the fastener to center the cap assembly on the fastener when the cap assembly is moved to the extended configuration.

5. The cap assembly of claim 1 wherein each of the nested sections has a large end and a small end, the small end of the end section being connected to the end wall, wherein, except the small end of the end section and the large end of the base section, an interior surface of the small end of each nested section engages an exterior surface of the large end of a successive nested section thereby limiting extension of the cap assembly in the extended configuration.

6. The cap assembly of claim 5, wherein the end wall and the small ends of the other nested sections except the base section each comprise a radially outward extending member that engages the small end of a successive nested section upon collapse of the cap assembly to the collapsed configuration to positively capture the nested sections within one another when the cap assembly is in the collapsed configuration.

7. The cap assembly of claim 1 wherein the plurality of nested sections have shapes selected from the group consisting of a cone frustum, a pyramid frustum, a square frustum and a pentagonal frustum.

8. The cap assembly of claim 1 wherein the nested sections are comprised of a thermoplastic.

9. A method for encapsulating a portion of a fastener with sealant wherein said portion of the fastener extends from a first surface into a space defined by the first surface and a second surface with limited clearance between a distal end of the fastener and the second surface, and wherein said portion of the fastener that extends into the space has a length greater than the limited clearance, the method comprising:
   providing a telescoping cap assembly with a plurality of nested sections having an extended configuration of a length at least as long as said portion of the fastener to be encapsulated and a collapsed configuration having a length sufficiently short to allow the cap assembly to be brought into a position in the limited clearance between the distal end of the fastener and the second surface;
   collapsing the cap assembly to the collapsed configuration;
   positioning the cap assembly while in the collapsed configuration between the distal end of the fastener and the second surface;
   telescoping the cap assembly over said portion of the fastener to the extended configuration to cover said portion of the fastener and engage the first surface;
   providing a sufficient amount of sealant within the cap assembly to encase said portion of the fastener in the sealant.

10. The method of claim 9 wherein the telescoping cap assembly comprises a plurality of nested sections that telescope from the collapsed configuration to the extended configuration, the plurality of nested sections comprising a base section comprising a base rim that engages the first surface in the extended configuration, the plurality of nested sections further comprising an end section that comprises an end wall, wherein the end wall and base rim define a length of the cap assembly in the extended configuration that is sufficient to encapsulate said portion of the fastener.

11. The method of claim 10 wherein each of the nested sections has a large end and a small end, the small end of the end section being connected to the end wall, wherein, except the small end of the end section and the large end of the base section, an interior surface of the small end of each nested section engages an exterior surface of the large end of a successive section so as to limit extension of the cap assembly in the extended configuration.

12. The method of claim 11 wherein the end wall and the small ends of the other nested sections except the base section each comprise a radially outward extending member that engages the small end of a successive nested section upon collapse of the cap assembly to positively capture the nested sections within one another when the cap assembly is in the collapsed configuration.

13. The method of claim 10 wherein the plurality of nested sections have a shape selected from the group consisting of a cone frustum, a pyramid frustum, a square frustum and a pentagonal frustum.

14. The method of claim 10 further comprising, prior to positioning the cap assembly between the distal end of the fastener and the second surface, filling the end section with the sufficient amount of sealant to encase said portion of the fastener after telescoping the cap assembly over said portion of the fastener to its extended configuration.

15. The method of claim 9 wherein the cap assembly includes an inlet orifice for injecting the sufficient amount of sealant and an outlet orifice for venting the cap assembly during the injection of the sealant.

16. A method of manufacturing a telescoping cap assembly, the telescoping cap assembly comprising a plurality of nested sections comprising a base section and an end section, the end section being connected to an end wall, wherein each of the nested sections has a large end and a small end, wherein, except the small end of the end section and the large end of the base section, an interior surface of the small end of each nested section is smaller than an exterior surface of the large end of a successive nested section so as to limit extension of the cap assembly in an extended configuration, the method comprising:
- 3D printing the large end of the base section,
- simultaneously 3D printing the plurality of nested sections in a partially extended configuration so the plurality of nested sections are not in contact with one another to ensure the nested sections will be movable relative to one another, and
- 3D printing the end wall.

17. The method of claim 16 further comprising 3D printing a radially outwardly extending member on the end wall and on the small ends of each other nested section except the base section, wherein each radially outwardly extending member engages the small end of a successive nested section upon collapse of the cap assembly to a collapsed configuration to positively capture the nested sections within one another.

18. The method of claim 16 wherein the cap assembly is 3D printed with a thermoplastic.

19. The method of claim 16 wherein the nested sections have a shape selected from the group consisting of a cone frustum, a pyramid frustum, a square frustum and a pentagonal frustum.

* * * * *